US012680563B2

(12) United States Patent
Chen

(10) Patent No.: US 12,680,563 B2
(45) Date of Patent: Jul. 14, 2026

(54) HYBRID BUTT-LAP JOINT, AND METHOD OF PRODUCTION

(71) Applicant: His Majesty the King in Right of Canada as Represented by the Minister of Natural Resources, Ottawa (CA)

(72) Inventor: Zheng Chen, Hamilton (CA)

(73) Assignee: HIS MAJESTY THE KING IN RIGHT OF CANADA, THE MINISTER OF NATURAL RESOURCES, Ottawa (CA)

( * ) Notice: Subject to any disclaimer, the term of this patent is extended or adjusted under 35 U.S.C. 154(b) by 1109 days.

(21) Appl. No.: 17/765,274

(22) PCT Filed: Oct. 30, 2020

(86) PCT No.: PCT/CA2020/051470
§ 371 (c)(1),
(2) Date: Mar. 30, 2022

(87) PCT Pub. No.: WO2021/081661
PCT Pub. Date: May 6, 2021

(65) Prior Publication Data
US 2022/0397141 A1 Dec. 15, 2022

Related U.S. Application Data

(60) Provisional application No. 62/928,585, filed on Oct. 31, 2019.

(51) Int. Cl.
*F16B 5/08* (2006.01)
*B23K 9/025* (2006.01)
(Continued)

(52) U.S. Cl.
CPC ................ *F16B 5/08* (2013.01); *B23K 9/025* (2013.01); *B23K 9/232* (2013.01); *B23K 26/242* (2015.10); *B23K 26/26* (2013.01)

(58) Field of Classification Search
CPC ........... F16B 5/08; B23K 26/21; B23K 26/24; B23K 26/32; B23K 26/323; B23K 26/322;
(Continued)

(56) References Cited

U.S. PATENT DOCUMENTS 3,575,574 A * 4/1971 Almqvist ............... B23K 9/035
219/160
3,731,868 A 5/1973 Arikawa et al.
(Continued)

FOREIGN PATENT DOCUMENTS

DE 464280 C * 8/1928
GB 416344 A 9/1934
(Continued)

OTHER PUBLICATIONS

C. Thomy and F. Vollertsen, Laser-Mig Hybrid Welding of Aluminium To Steel—Effect of Process Parameters on Joint Properties, Welding in the World, No. 05/06 2012 vol. 56.
(Continued)

*Primary Examiner* — Jonathan P Masinick
(74) *Attorney, Agent, or Firm* — Brion Raffoul

(57) ABSTRACT
Lap joints and butt joints can be used for braze-welding metals together, particularly metal sheet materials. Disclosed herein are hybrid joints that include features of both lap joints and of butt joints, that are suitable for braze-welding together articles and workpieces, particularly sheets, composed of different metals including aluminum and steel. Methods for braze-welding such hybrid joints are also disclosed.

21 Claims, 10 Drawing Sheets

(51) Int. Cl.
   *B23K 9/23*       (2006.01)
   *B23K 26/242*     (2014.01)
   *B23K 26/26*      (2014.01)

(58) Field of Classification Search
   CPC ... B23K 1/14; B23K 1/16; B23K 1/19; B23K
   2103/18; B23K 2103/20
   See application file for complete search history.

(56)          References Cited

U.S. PATENT DOCUMENTS

| | | | | |
|---|---|---|---|---|
| 3,842,237 | A * | 10/1974 | Ujiie | B23K 33/004 |
| | | | | 219/137 R |
| 3,940,049 | A * | 2/1976 | Richter | B23K 20/085 |
| | | | | 228/136 |
| 4,030,849 | A * | 6/1977 | Keifert | B23K 9/23 |
| | | | | 403/272 |
| 4,032,243 | A * | 6/1977 | Keifert | F16B 5/08 |
| | | | | 403/272 |
| 5,205,468 | A * | 4/1993 | Budenbender | B23K 26/361 |
| | | | | 219/121.64 |
| 6,060,682 | A * | 5/2000 | Westbroek | B23K 26/24 |
| | | | | 219/121.64 |
| 6,223,976 | B1 * | 5/2001 | Clement | B23K 1/19 |
| | | | | 228/262.72 |
| 6,828,526 | B1 | 12/2004 | Stol et al. | |
| 6,906,281 | B2 * | 6/2005 | Musselman | B23K 9/167 |
| | | | | 219/137 WM |
| 7,015,417 | B2 | 3/2006 | Takikawa et al. | |
| 7,371,994 | B2 | 5/2008 | Stol | |
| 7,693,696 | B2 * | 4/2010 | Forrest | B23K 26/0608 |
| | | | | 700/250 |
| 7,700,198 | B2 | 4/2010 | Takeda et al. | |
| 7,748,598 | B2 * | 7/2010 | Want | B01J 19/02 |
| | | | | 228/262.71 |
| 7,800,011 | B2 * | 9/2010 | Fukuda | B23K 9/232 |
| | | | | 428/653 |
| 7,841,507 | B2 * | 11/2010 | Kempa | B23K 9/173 |
| | | | | 228/171 |
| 8,253,062 | B2 | 8/2012 | Forrest et al. | |
| 8,742,294 | B2 * | 6/2014 | Fukuda | B23K 9/232 |
| | | | | 219/136 |
| 9,186,754 | B2 | 11/2015 | Matsumoto et al. | |
| 9,440,314 | B2 | 9/2016 | Devers et al. | |
| 9,616,527 | B2 | 4/2017 | Briand et al. | |
| 10,016,958 | B2 * | 7/2018 | Alber | B23K 26/60 |
| 10,052,721 | B2 * | 8/2018 | Gu | B23K 26/26 |
| 10,244,588 | B2 * | 3/2019 | Jones | B23K 9/235 |
| 10,293,424 | B2 * | 5/2019 | Landwehr | B23K 35/0244 |
| 10,501,827 | B2 * | 12/2019 | Champagne, Jr. | B23K 35/36 |
| 10,593,034 | B2 * | 3/2020 | Spinella | B23K 11/0066 |
| 10,619,540 | B2 * | 4/2020 | Blueml | B23K 26/242 |
| 11,213,879 | B2 * | 1/2022 | Glueck | F16B 17/008 |
| 11,318,566 | B2 * | 5/2022 | Hu | B23K 31/02 |
| 11,511,375 | B2 * | 11/2022 | Hu | B23K 11/20 |
| 12,308,625 | B2 * | 5/2025 | Nakamura | H01R 43/0221 |
| 2013/0028659 | A1 * | 1/2013 | Leitner | B23K 9/1735 |
| | | | | 228/256 |
| 2013/0092667 | A1 * | 4/2013 | Peters | B23K 35/0261 |
| | | | | 219/121.64 |
| 2013/0327749 | A1 * | 12/2013 | Denney | B23K 9/0956 |
| | | | | 219/146.1 |
| 2014/0003860 | A1 * | 1/2014 | Evangelista | B23K 26/60 |
| | | | | 219/121.64 |
| 2016/0001403 | A1 | 1/2016 | Matsumoto et al. | |
| 2016/0167179 | A1 * | 6/2016 | Wang | B23K 31/02 |
| | | | | 228/44.3 |
| 2016/0193685 | A1 * | 7/2016 | Karner | B23K 9/235 |
| | | | | 219/137 WM |
| 2017/0095875 | A1 | 4/2017 | Mizobata et al. | |
| 2018/0065206 | A1 | 3/2018 | Mennucci et al. | |
| 2019/0232424 | A1 * | 8/2019 | Walther | B23K 26/323 |
| 2024/0369087 | A1 * | 11/2024 | Heck | B64F 5/10 |

FOREIGN PATENT DOCUMENTS

| | | | | |
|---|---|---|---|---|
| GB | 665444 | A * | 1/1952 | B63B 3/14 |
| GB | 1105939 | | 3/1968 | |
| JP | 55045506 | A * | 3/1980 | |
| JP | 57130767 | A * | 8/1982 | |
| JP | 2013230479 | A * | 11/2013 | |
| JP | 2019076930 | A * | 5/2019 | |

OTHER PUBLICATIONS

P. Wang, X. Chen, Q. Pan, B. Madigan, J. Long, Laser welding dissimilar materials of aluminum to steel: an overview, Int J Adv Manuf Technol (2016) 87:3081-3090.

L. Cui, H. Chen, B. Chen, D. He, Welding of Dissimilar Steel/Al Joints Using Dual-Beam Lasers with Side-by-Side Configuration, Metals 2018, 8, 1017.

\* cited by examiner

HYBRID BUTT-LAP JOINT, AND METHOD OF PRODUCTION

RELATED APPLICATIONS

This application is a National Stage Application under 35 U.S.C. 371 of co-pending PCT application number PCT/CA2020/051470 designating the United States and filed Oct. 30, 2020; which claims the benefit of U.S. Provisional application No. 62/928,585 and filed Oct. 31, 2019, each of which are hereby incorporated by reference in their entireties.

FIELD OF THE INVENTION

The invention relates to the field of welding, and in particular the braze-welding of two different metals, such as two different sheet metals together.

BACKGROUND

Welding and joining techniques sometimes require secure joining of different metals. For example, in production and industry it is often desired to weld aluminum to steel or vice versa. Steel sheets and components have relatively high strength but higher weight compared to corresponding aluminum sheets and components. However, aluminum sheets and components are increasingly used for example in the car manufacturing industry, in view of their lower density and lightness relative to similar steel components.

Various welding techniques may be employed to achieve such welded joints, the choice of which may depend upon the components being welded. For example, braze-welding (also often called brazing-welding) is known for joining aluminum and steel sheets together. Filler materials and fed wires may also be used to supply molten material to help bond the metals together.

Lap joints may be fabricated by brazing (not to be confused with braze-welding) and require minimal or no fixing before the brazing step. Lap joints increase the joint loading capability by providing additional brazed surface area. In contrast, butt joints are not as strong as lap joints because of the small brazed surface area. A variation of the butt joint known as a "scarf" joint (where the two members have tapered ends which lap together) adds strength but is more problematic in terms of its preparation and fixture. Another variation combines the advantages of both lap joints and butt joints, and is referred to as a "butt-lap" joint.

Similarly, braze-welded joints between dissimilar metals typically comprise lap-joints, in which components or sheets of different metals are braze-welded in an overlapping relationship such that their facing sides are brought into contact for the braze-welding step. Alternatively, butt joints may be used in which components or sheets of different metals are braze-welded end-to-end or edge-to-edge.

Braze-welded butt-joints made by the techniques of the prior art can present some challenges. For example, when producing an aluminum/steel butt-joint from one side, the welding parameter window may be relatively small and may be difficult to control. If the heat input is too great, the heat may burn through the aluminum sheet, whereas if the heat input is too small then it may be insufficient to produce the braze-welding on the side of the butt joint opposite the welding energy.

There is a need in the art for improved connection between aluminum and steel components, such as for example aluminum and steel sheets, for example in an end-to-end or an edge-to-edge configuration. There is also a need for improved techniques that give rise to stronger braze-welded joints between different metals, particularly under multiaxial loading conditions.

SUMMARY

Certain embodiments provide a method for producing a hybrid butt-lap braze-welded joint between a steel workpiece such as a steel sheet and an aluminum workpiece such as an aluminum sheet, each of which comprise two faces and at least one edge surface, and wherein the steel sheet optionally comprises a zinc surface layer, the method comprising the steps of:

a) positioning the steel sheet and the aluminum sheet for edge-to-edge contact or near contact with one another, thereby to provide a steel/aluminum butt region between an edge of the steel sheet and an edge of the aluminum sheet;

b) positioning a second aluminum sheet flush across the steel/aluminum butt region on one side of the steel and aluminum sheets, so that the second aluminum sheet overlaps in contact or near contact both with a portion of one face of the steel sheet and a portion of one face of the aluminum sheet adjacent the steel/aluminum butt region;

c) braze-welding along the steel/aluminum butt region, on a side of the steel and aluminum sheets opposite the second aluminum sheet; and d) optionally welding on a same side of the steel and aluminum sheets as the second aluminum sheet, to lap braze-weld the second aluminum sheet and the steel sheet together.

Certain other exemplary embodiments provide a hybrid butt-lap joint comprising:

a portion of a steel workpiece such as a steel sheet and a portion of an aluminum workpiece such as an aluminum sheet, with edges positioned in near contact with one another to provide a steel/aluminum butt region;

a second aluminum sheet across the steel/aluminum butt region flush with one face of the steel sheet and one face of the aluminum sheet, so that the second aluminum sheet overlaps in contact or near contact with both the steel sheet and aluminum sheet on one side thereof;

solidified weld filler material extending across the steel/aluminum butt region to provide a butt joint, and between at least the second aluminum sheet and the steel sheet to provide a lap-joint therebetween;

optionally a solidified, previously melted, filler alloy foil or powder positioned between the second aluminum sheet and either or both of the steel sheet and the aluminum sheet;

optionally solidified weld metal between the second aluminum sheet and the steel sheet;

with the second aluminum sheet at least partially brazed to the steel sheet.

Certain other exemplary embodiments provide a method for producing a hybrid butt-lap joint between a steel workpiece such as a steel sheet and an aluminum workpiece such as an aluminum sheet, each of which comprise two faces and at least one edge surface, and wherein the steel sheet optionally comprises a zinc surface layer, the method comprising the steps of:

a) positioning the steel and aluminum sheets for edge-to-edge near contact with one another, thereby to provide a steel/aluminum butt region between an edge of the steel sheet and an edge of the aluminum sheet;

b) positioning a second steel sheet flush across the steel/ aluminum butt region on one side of the steel and aluminum sheets, so that the second steel sheet over- laps in contact or near contact both with a portion of one face of the steel sheet and a portion of one face of the aluminum sheet adjacent the steel/aluminum butt region;

c) braze-welding along the steel/aluminum butt region, on a side of the steel and aluminum sheets opposite the second steel sheet d) optionally welding the steel sheet to the second steel sheet Certain other exemplary embodiments provide a hybrid butt-lap joint comprising:

a portion of a steel workpiece such as a steel sheet and a portion of an aluminum workpiece such as an alumi- num sheet with edges positioned in contact or near contact with one another to provide a steel/aluminum butt region;

a second steel sheet across the steel/aluminum butt region flush with one face of the steel sheet and one face of the aluminum sheet, so that the second steel sheet overlaps in contact or near contact with both the steel sheet and aluminum sheet on one side thereof;

solidified weld filler material extending across the steel/ aluminum butt region to provide a butt joint, and between at least the second steel sheet and the alumi- num sheet to provide a lap-joint therebetween;

optionally a solidified, previously melted, filler alloy foil or powder positioned between the second steel sheet and either or both of the steel sheet and the aluminum sheet; and optionally solidified weld metal between the steel sheet and the second steel sheet;

with the second steel sheet at least partially brazed to the steel sheet.

Other embodiments include a hybrid butt-lap joint pre- pared by any method described herein, as well as a use of any hybrid butt-lap joint described herein.

4

Figures 3A, 3B:
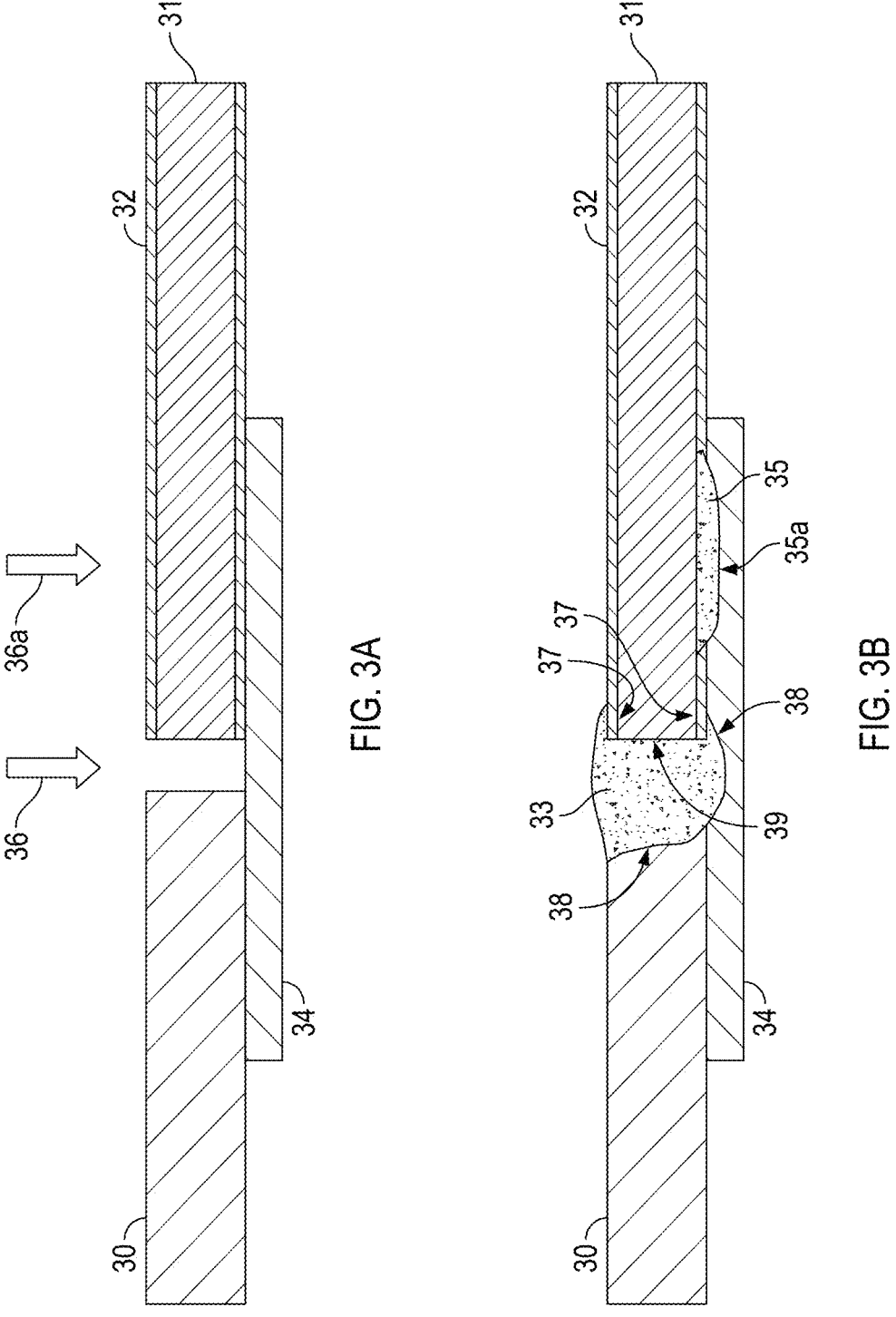
FIG. 3A illustrates in cross-section a hybrid butt-lap joint configuration with a second aluminum sheet adjacent one side of the butt edge region, before gas metal arc braze- welding in the butt region, with additional laser brazing between the steel sheet and the second aluminum sheet.
FIG. 3B illustrates in cross-section a hybrid butt-lap joint configuration with a second aluminum sheet adjacent one side of the butt edge region, after gas metal arc braze- welding in the butt region, with additional laser brazing between the steel sheet and the second aluminum sheet.
Figures 3C, 3D:
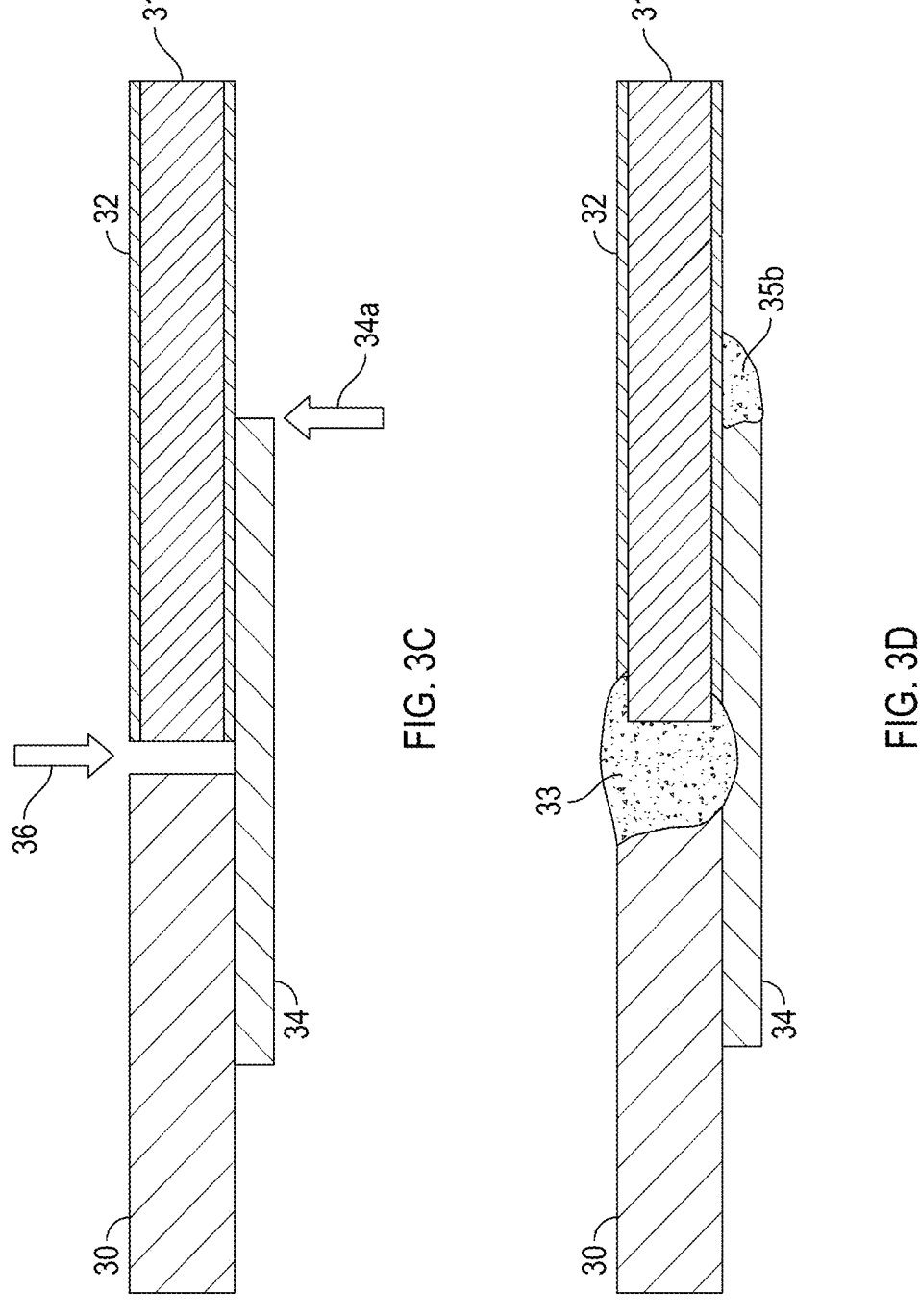
FIG. 3C illustrates in cross-section a hybrid butt-lap joint configuration with a second aluminum sheet adjacent one side of the butt edge region, before combined laser-arc braze-welding in the butt region, with additional lap braze- welding between the second aluminum sheet and the steel sheet.

FIG. 3D illustrates in cross-section a hybrid butt-lap joint configuration with a second aluminum sheet adjacent one side of the butt edge region, after combined laser-arc braze- welding in the butt region, with additional lap braze-welding between the second aluminum sheet and the steel sheet.

Figures 4A, 4B:
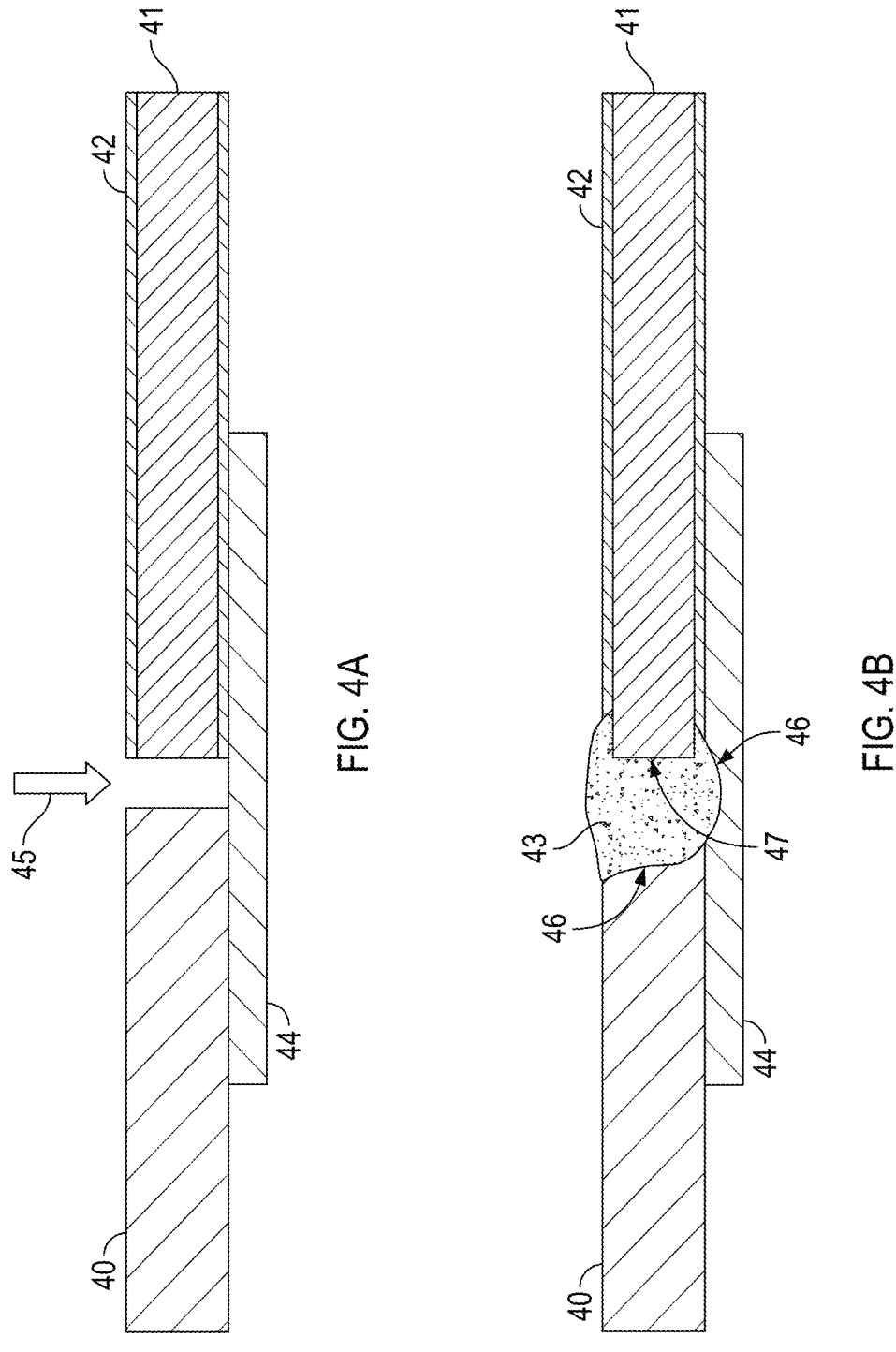

FIG. 4A illustrates in cross-section a hybrid butt-lap joint configuration with a second aluminum sheet adjacent one side of the butt edge region, before gas metal-arc braze- welding (GMAW) in the butt region.

FIG. 4B illustrates in cross-section a hybrid butt-lap joint configuration with a second aluminum sheet adjacent one side of the butt edge region, after gas metal-arc braze- welding (GMAW) in the butt region.

Figures 5A, 5B:
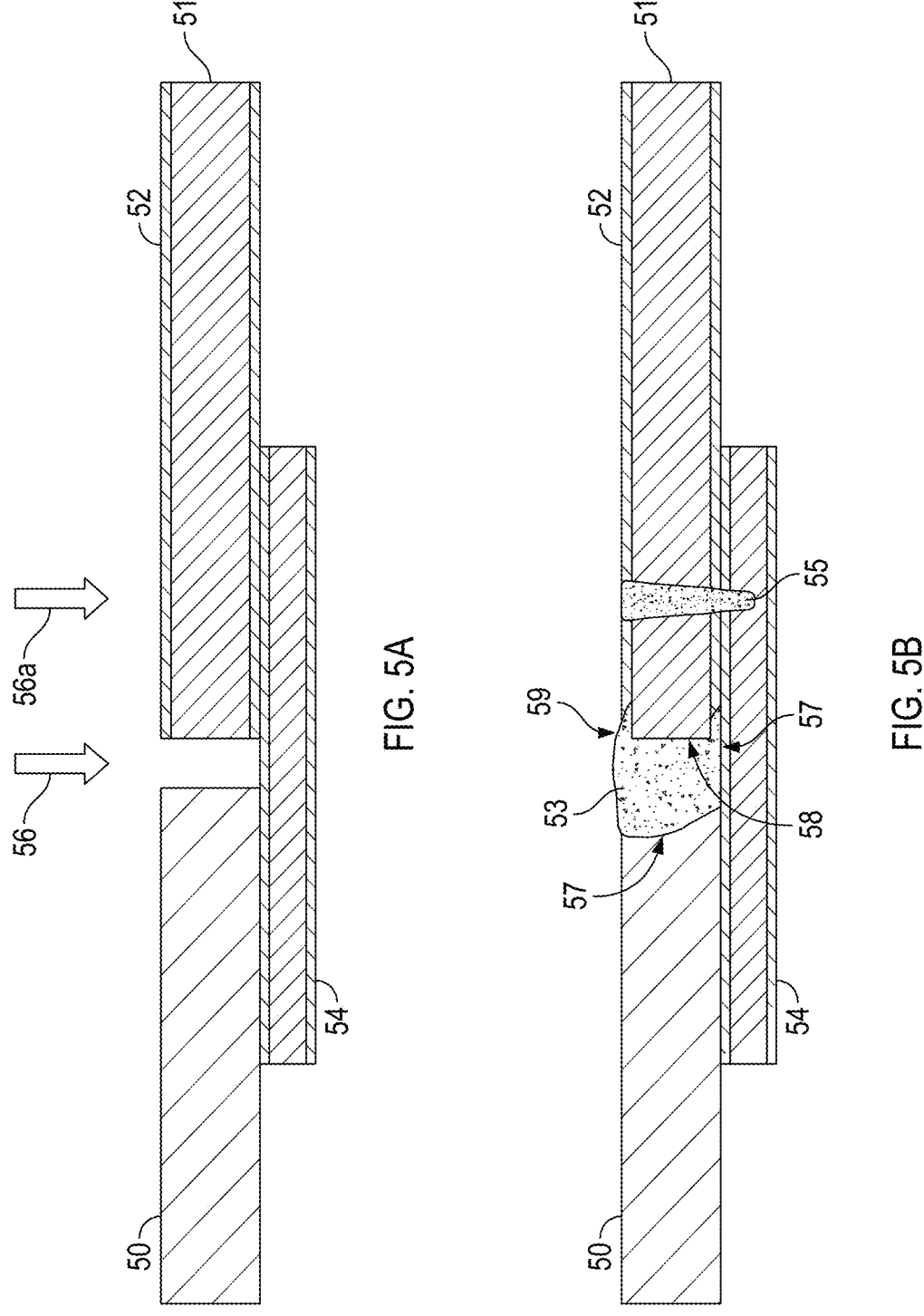

FIG. 5A illustrates in cross-section a hybrid butt-lap joint configuration with a second steel sheet adjacent one side of the butt edge region, before gas metal arc braze-welding in the butt region, with additional laser welding between the steel sheet and the second steel sheet.

FIG. 5B illustrates in cross-section a hybrid butt-lap joint configuration with a second steel sheet adjacent one side of the butt edge region, after gas metal arc braze-welding in the butt region, with additional laser welding between the steel sheet and the second steel sheet.

Figures 5C, 5D:
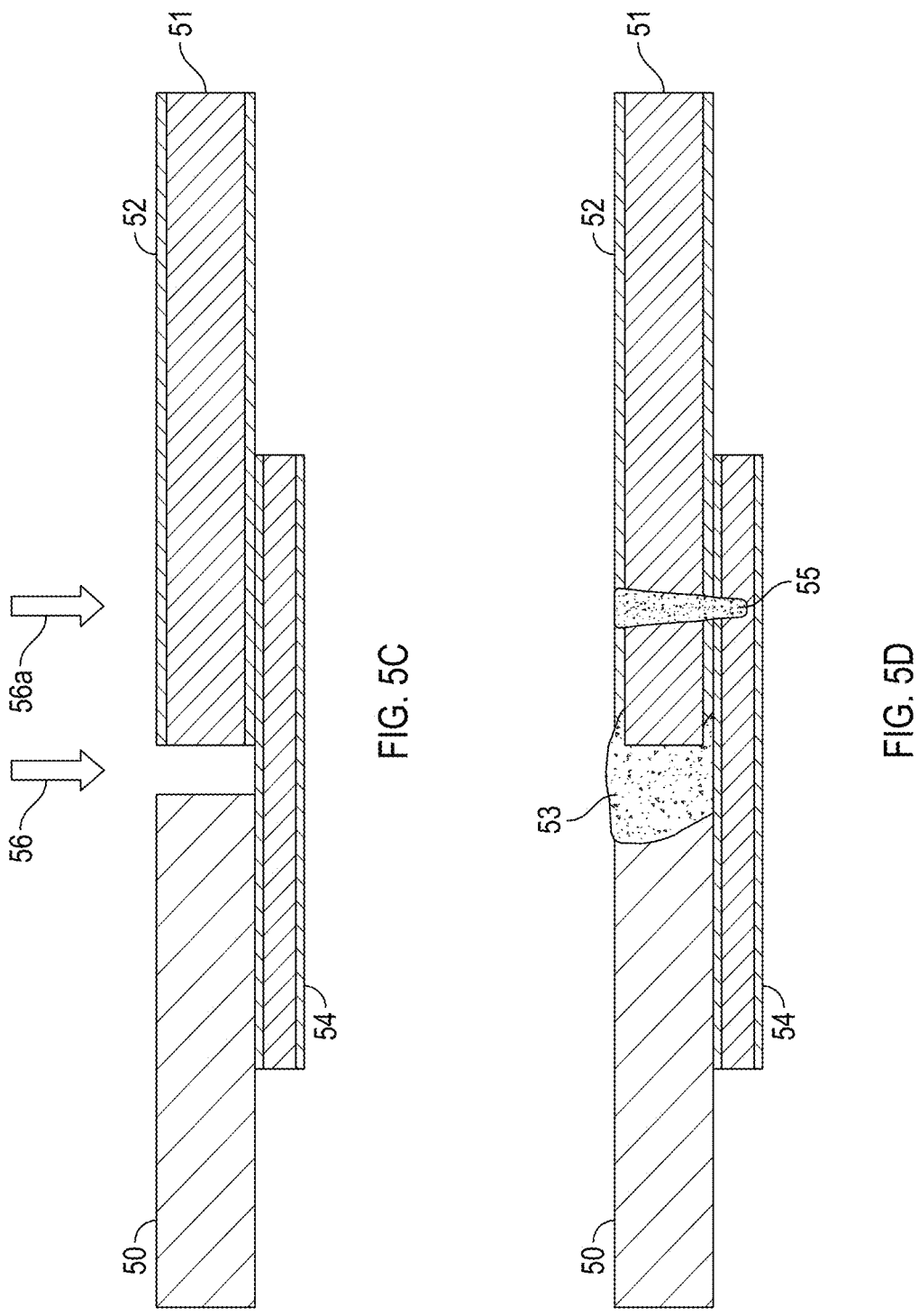

FIG. 5C illustrates in cross-section a hybrid butt-lap joint configuration with a second steel sheet adjacent one side of the butt edge region, before combined laser-arc braze- welding in the butt region, with additional laser welding between the steel sheet and the second steel sheet.

FIG. 5D illustrates in cross-section a hybrid butt-lap joint configuration with a second steel sheet adjacent one side of the butt edge region, after combined laser-arc welding in the butt region, with additional laser welding between the steel sheet and the second steel sheet.

Figures 6A, 6B:
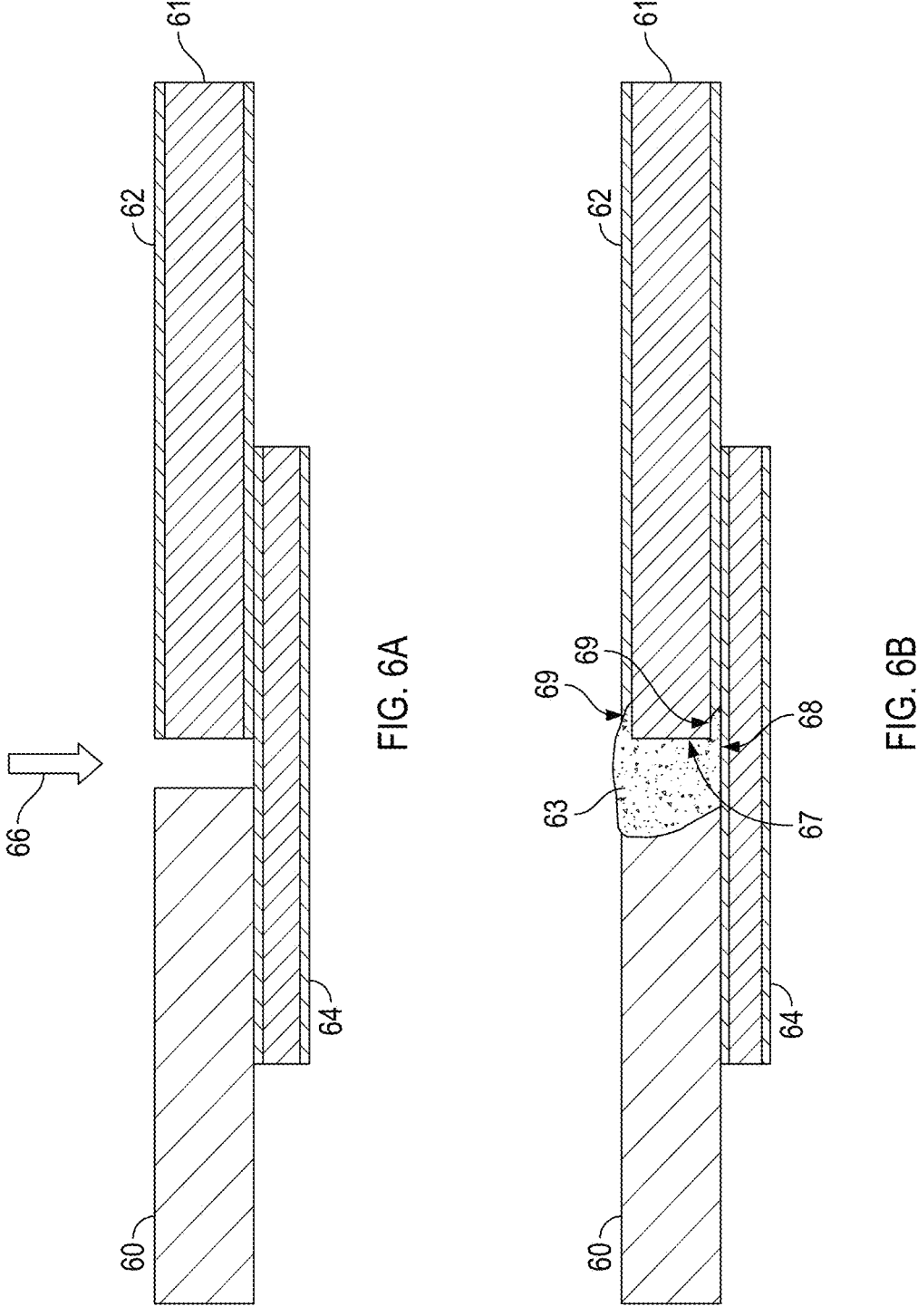

FIG. 6A illustrates in cross-section a hybrid butt-lap joint configuration with a second steel sheet adjacent one side of the butt edge region, before gas metal arc braze-welding in the butt region.

FIG. 6B illustrates in cross-section a hybrid butt-lap joint configuration with a second steel sheet adjacent one side of the butt edge region, after gas metal arc braze-welding.

Figures 6C, 6D:
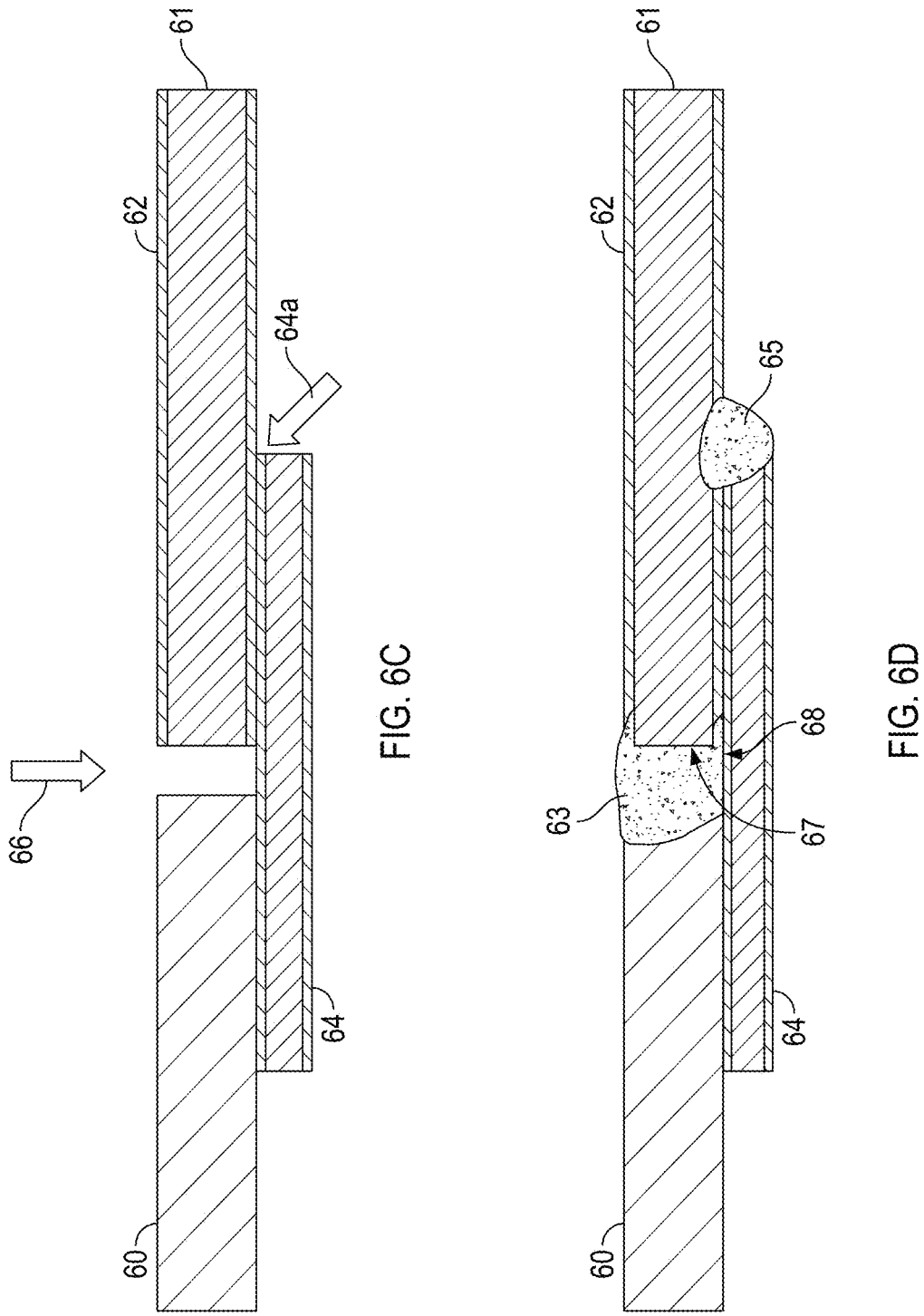

FIG. 6C illustrates in cross-section a hybrid butt-lap joint configuration with a second steel sheet adjacent one side of the butt edge region, before gas metal arc braze-welding in the butt region, with additional gas metal arc welding between the steel sheet and the second steel sheet.

FIG. 6D illustrates in cross-section a hybrid butt-lap joint configuration with a second steel sheet adjacent one side of the butt edge region, after gas metal arc braze-welding in the butt region, with additional gas metal arc welding between the steel sheet and the second steel sheet.

Figure 7:
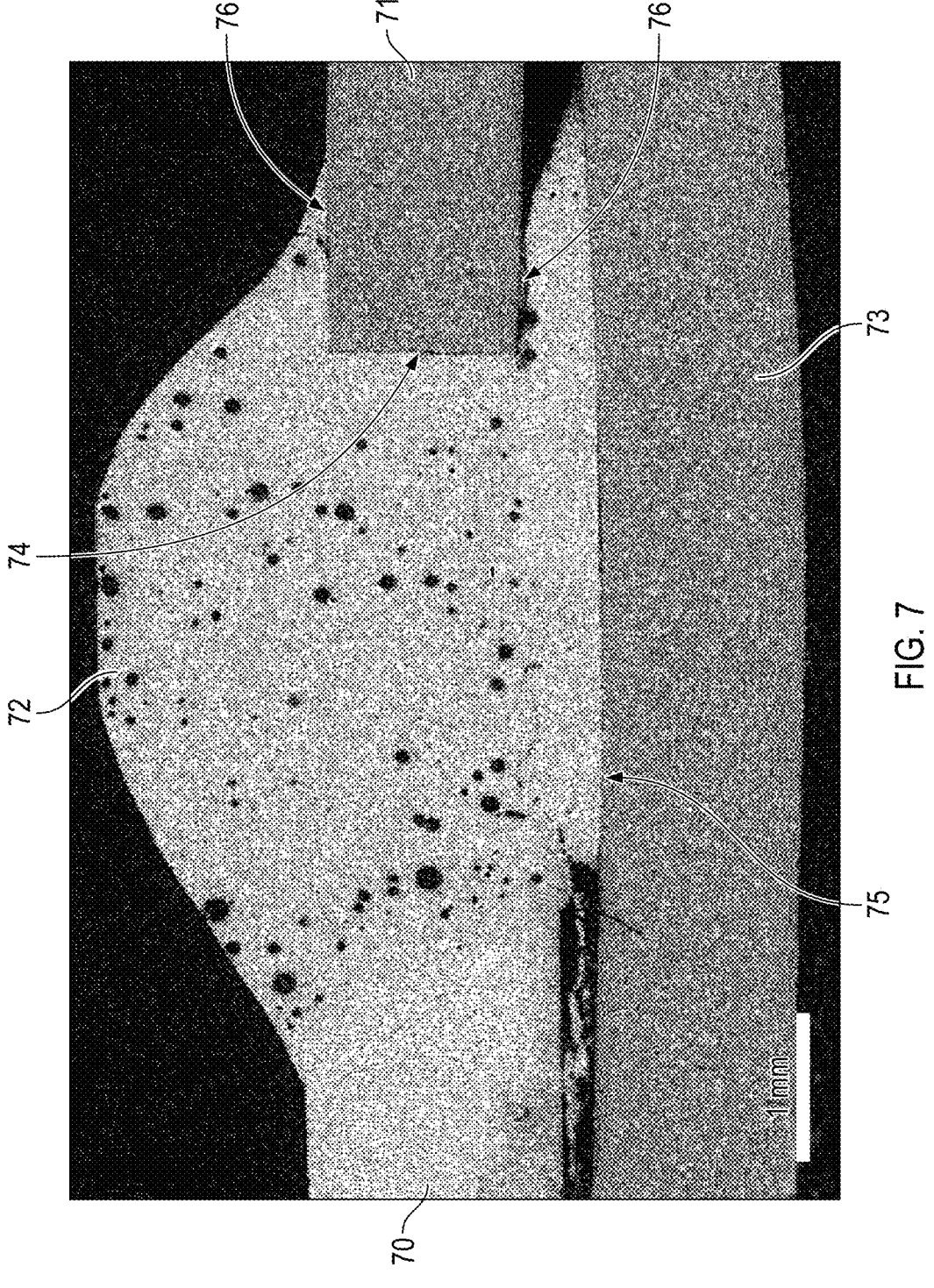

FIG. 7 is photograph that provides a cross-sectional view of a hybrid "butt-lap" joint produced in accordance with Example 6.

DETAILED DESCRIPTION OF SELECTED EMBODIMENTS

Disclosed herein are 'hybrid' welded joints including braze-welded joints, and methods for their production. Such joints are considered 'hybrid' because they include both butt joint interfaces and also lap-joint interfaces resulting from their manufacture. In any embodiments described, reference to an aluminum "sheet" or a steel "sheet" that is welded may be substituted with any other aluminum workpiece, compo- nent or item, together with any other steel workpiece com- ponent or item. The disclosed methods and resulting hybrid joints are suitable for joining various workpieces, components or items together whether or not either or both of the joining metals take the form of a sheet or sheet-like member.

Further, in any of the embodiments disclosed herein, the term "aluminum sheet" as used herein may comprise for example unalloyed aluminum and a wide variety of aluminum alloys, whether coated or uncoated, in different forms including wrought sheet extrusions, etc., as well as castings.

Further, in any of the embodiments disclosed herein, the term "steel sheet" as used herein may comprise for example a base steel substrate of any of a wide variety of strength and grades that is either coated or uncoated.

Selected the braze-welded joints are produced by the use of an additional metal component or sheet in addition to the aluminum and steel components or sheets that are braze-welded together. Typically, though not necessarily, the additional metal sheet is composed either of aluminum or of steel, and optionally for convenience may be of a generally smaller dimension at least suitable to come into contact with faces of the aluminum and steel components or sheets, either side of and adjacent a butt region at and between the aluminum and steel workpieces, components or sheets.

Application to an assembly (comprising the aluminum component or sheet, the steel component or sheet, and the additional metal sheet) of appropriate welding techniques can generate a braze-welded joint comprising features of both butt joints and lap joints. Accordingly, the resulting 'hybrid' braze-welded joint exhibits excellent strength characteristics compared to correspondingly welded joints that comprise only a butt-joint, or only a lap joint, under conditions including but not limited to multiaxial loading.

For example, certain embodiments disclosed herein provide for a method for producing a hybrid butt-lap joint between a steel sheet and an aluminum sheet, each of which comprise two faces and at least one edge surface, and wherein the steel sheet optionally comprises a zinc, or zinc alloy, surface layer. Such method comprises an initial step of positioning the steel and aluminum sheets for edge-to-edge near contact with one another, thereby to provide a steel/aluminum butt region between an edge of the steel sheet and an edge of the aluminum sheet. The method further comprises a step of positioning a second aluminum sheet generally flush across the steel/aluminum butt region on one side of the steel and aluminum sheets, so that the second aluminum sheet overlaps in contact or near contact both with a portion of one face of the steel sheet and a portion of one face of the aluminum sheet adjacent the steel/aluminum butt region. It should be noted that the step of positioning the second aluminum sheet may occur to one of the aluminum and steel sheets first, adjacent one edge thereof, before the other of the steel and aluminum sheets is brought into contact with the second aluminum sheet. Optionally, the second aluminum sheet may be brazed, or lap braze-welded to the steel sheet before positioning the aluminum sheet for edge-to-edge contact or near contact with the steel sheet, and overlapping the aluminum sheet in contact or near contact with the second aluminum sheet. Finally, once the sheets are in close relationship with one another the method further includes a step of braze-welding along the steel/aluminum butt region, on a side of the steel and aluminum sheets opposite the second aluminum sheet.

In some corresponding embodiments the step of braze-welding may comprise feeding molten filler wire to the steel/aluminum butt region, to produce a braze-welded butt joint, and optionally between the steel sheet and the second aluminum sheet by capillary action, to produce a brazed lap joint therebetween. Optionally, a filler alloy foil or powder may be positioned between the second aluminum sheet and one or both of the aluminum sheet and steel sheet, which may melt during the step of braze-welding to facilitate formation of the hybrid butt-lap joint.

In some embodiments, at least a portion of the second aluminum sheet adjacent the aluminum sheet may be melted during step c) of braze-welding, thereby to form a welded joint between the aluminum sheet and the second aluminum sheet. Further, step c) of braze-welding may comprise gas metal arc welding (GMAW), preferably cold metal transfer arc welding, gas tungsten arc welding (GTAW) with adding wire, laser welding with adding wire, or hybrid or combined laser-arc welding, or other welding techniques as required. For example, step c) of braze-welding may comprise laser-arc braze-welding by combined application to at least the steel/aluminum butt region (e.g. see FIG. 3C), and optionally to the interface between the steel sheet and the second aluminum sheet, of a laser and a gas metal arc welding torch. In such situations the laser may provide a laser beam having a power of for example from 1-7 kW, preferably from 1.8 to 5 kW. Furthermore, the laser beam may optionally be directed perpendicular or substantially perpendicular to the aluminum sheet adjacent the steel/aluminum butt region, optionally on the edge of the aluminum sheet.

In some embodiments the welding torch employs argon shielding gas. In other embodiments the welding torch may apply filler wire to the steel/aluminum butt region, optionally at an angle of 1-10 degrees, preferably 2-5 degrees, compared to perpendicular to the steel sheet. Optionally, the welding torch may employ filler wire selected from the group consisting of, but not limited to: ER4043, ER4047 and AlSi3Mn, optionally with a feed rate of 4-11 m/min.

Step c) of laser-arc braze welding may proceed at any suitable speed, but optionally may proceed along the steel/aluminum butt region at a speed of 2-6 m/min, preferably from 4-6 m/min, more preferably from 4.5 to 5.75 m/min.

In some embodiments, braze-welding at a high speed at the constant laser and arc powers may reduce heat input to minimize the formation of hard and brittle intermetallics, for example, $Al_3Fe$, $Al_5Fe_2$, $Al_8Fe_2Si$, $Al_8(Fe,Mn)_2Si$, at the braze-welded weld metal/steel interface, thereby to improve the joint strength.

In other embodiments (e.g. see FIG. 3A) step c) of braze welding may comprise conventional gas metal arc welding, preferably cold metal transfer arc welding at any suitable speed. Optionally, the cold metal transfer welding may employ a welding torch that employs argon shielding gas. Alternatively, the cold metal transfer welding may employ a welding torch with wire fed perpendicular or substantially perpendicular to the steel sheet/aluminum sheet on the edge of the aluminum sheet in butt region. Optionally, step c) of gas metal arc brazing may proceed with a weaving motion towards the steel sheet.

Optionally, the method further includes a step of brazing, for example, laser brazing between the steel and the second aluminum sheet (e.g. see FIG. 3A and FIG. 3B), or lap braze-welding of the edge of the second aluminum sheet to the steel sheet (e.g. see FIG. 3C and FIG. 3D). A step of brazing, or braze-welding the second aluminum sheet to the steel sheet may be performed before, simultaneously with, or after the step of braze-welding along the steel/aluminum butt region.

In any of the embodiments disclosed herein, the aluminum sheet may be substituted with an aluminum components of any shape or configuration suitable for braze-welding. However, in the case of an aluminum sheet, the sheet may have any thickness, or a thickness of 0.5-4 mm, preferably 0.6-3 mm, more preferably 0.8-2.5 mm. Likewise, in any of the embodiments disclosed herein, the steel sheet may be substituted with a steel component of any shape or configuration suitable for braze-welding. However, in the case of a steel sheet, the sheet may have any thickness, or a thickness of 0.5-4 mm, preferably 0.6-3 mm, more preferably 0.7-2 mm.

In any of the embodiments disclosed herein, the thickness of the aluminum sheet is optionally larger than the thickness of the steel sheet.

In any of the methods disclosed herein, the distance between the edge of the steel sheet and the edge of the aluminum sheet at the steel/aluminum butt region is optionally from 0-5 mm, and preferably from 0-2 mm. Further, in any of the methods disclosed herein, the second aluminum sheet may have any thickness, or a thickness of 0.5-2 mm, or 0.8-1.5 mm. Further, in any of the methods disclosed herein, the distance between the face of the steel sheet and the second aluminum sheet is optionally from 0-1 mm. Optionally, as required, a clearance of from 0.025 mm to 0.2 mm, preferably 0.05 mm to 0.1 mm is maintained between the face of the steel sheet and the second aluminum sheet.

Still further embodiments provide a hybrid butt-lap joint comprising: a portion of a steel sheet and a portion of an aluminum sheet with edges positioned in near contact with one another. The joint further comprises a second aluminum sheet across the steel/aluminum interface flush with one face of the steel sheet and one face of the aluminum sheet, so that the second aluminum sheet overlaps in contact or near contact with both the steel sheet and aluminum sheet on one side thereof. Furthermore, solidified weld metal extends across the steel/aluminum butt region to provide a butt-joint, and between at least the second aluminum sheet and the steel sheet to provide a lap-joint therebetween. Optionally, a solidified, previously melted, filler alloy foil or powder may be positioned between the second aluminum sheet and either or both of the steel sheet and the aluminum sheet. The joint at least includes the second aluminum sheet at least partially welded to the aluminum sheet.

Further embodiments provide any hybrid butt-lap joint produced by the methods herein disclosed that employ a second aluminum sheet.

Further embodiments provide any steel/aluminum article comprising any hybrid butt-lap joint as disclosed herein that includes a second aluminum sheet.

Still further embodiments provide a method for producing a hybrid butt-lap joint between a steel sheet and an aluminum sheet, each of which comprise two faces and at least one edge surface, wherein the steel sheet optionally comprises a zinc surface layer. In such embodiments the method comprises a step of positioning the steel and aluminum sheets for edge-to-edge near contact with one another, thereby to provide a steel/aluminum butt region between an edge of the steel sheet and an edge of the aluminum sheet.

The method also provides a step of positioning a second steel sheet flush across the steel/aluminum butt region on one side of the steel and aluminum sheets, so that the second steel sheet overlaps in contact or near contact both with a portion of one face of the steel sheet and a portion of one face of the aluminum sheet adjacent the steel/aluminum butt region. It may be noted, however, that the second steel sheet may be brought into position adjacent one of the aluminum sheet and the steel sheet before the other of the aluminum sheet and the steel sheet are also positioned adjacent a portion of the second steel sheet. Optionally, the second steel sheet may be welded to the steel sheet before positioning the aluminum sheet for edge-to-edge contact or near contact with the steel sheet, and overlapping the aluminum sheet in contact or near contact with the second steel sheet.

A further step of braze-welding along the steel/aluminum butt region, on a side of the steel and aluminum sheets opposite the second steel sheet, may occur once the aluminum sheet, the steel sheet, and the second steel sheet are in position relative to one another.

In such embodiments the step of braze-welding may comprise feeding molten filler wire to the steel/aluminum butt region, so that an edge surface of the aluminum sheet is melted and mixed with molten filler alloy to produce molten weld metal. The molten weld metal wets and reacts with the steel at the edge surface of the steel to produce a braze-welded butt joint between the steel and aluminum sheets at the steel/aluminum butt region. The step of braze-welding may further include producing a braze-welded lap joint between the aluminum sheet and the second steel sheet after solidification of the molten weld metal.

In such embodiments, optionally a filler alloy foil or powder may be positioned between the second steel sheet and one or both of the aluminum sheet and the steel sheet, which melts during the step of braze-welding to facilitate formation of the hybrid butt-lap joint.

Certain embodiments disclosed may further comprise a step of welding at least a portion of the steel sheet and the second steel sheet by any suitable welding method, thereby to form a welded joint between the steel sheet and the second steel sheet.

In further embodiments the step of braze-welding may comprise gas metal arc welding (GMAW), gas tungsten arc welding (GTAW) with adding wire, laser welding with adding wire, or hybrid or combined laser-arc welding, or other welding techniques as required.

In other embodiments (e.g. see FIG. 5C) the step of braze-welding may comprise laser-arc braze-welding by combined application to at least the steel/aluminum butt region, and optionally an interface between the steel sheet and the second steel sheet, of a laser and a welding torch. The laser may provide a laser beam of any power, or a power of from 1-7 kW, preferably from 1.8 to 5 kW. Optionally, in any such embodiments, the laser beam may optionally be directed perpendicular or substantially perpendicular to the aluminum sheet on the edge of the aluminum sheet.

The laser-arc braze-welding along the butt region may proceed at any speed, but in some embodiments proceeds along the steel/aluminum interface or butt region at a speed of 2-6 m/min, preferably from 4-6 m/min, more preferably from 4.5 to 5.75 m/min.

Preferably, braze-welding at a high braze-welding speed at the constant laser and arc powers may reduce heat input to minimize the formation of hard and brittle intermetallics, for example, $Al_3Fe$, $Al_5Fe_2$, $Al_8Fe_2Si$, $Al_8(Fe,Mn)_2Si$, at the braze-welded weld metal/steel interface, thereby to improve the joint strength.

Referring for example to FIG. 5A, in other embodiments the step of braze-welding may comprise gas metal arc braze-welding to at least the steel/aluminum butt region at any speed, and optionally an interface between the steel sheet and the second steel sheet.

Other embodiments may involve a welding torch that employs argon shielding gas for the braze welding step. As required, the welding torch may optionally apply filler wire to the steel/aluminum butt region on the edge of the aluminum sheet at an angle of 1-10 degrees, preferably 2-5 degrees, compared to perpendicular to the steel sheet. For example, the welding torch may employ filler wire selected from the group consisting of, but not limited to: ER4043, ER4047 and AlSi3Mn, optionally with a feed rate of 4-11 m/min.

Optionally, any gas metal arc braze-welding as described herein may proceed with a weaving motion towards the steel side.

Optionally, the method further includes a step of laser welding (e.g. see FIG. 5A and FIG. 5C), or gas metal arc welding (e.g. see FIG. 6C) of the second steel sheet to the steel sheet. Step of welding the second steel sheet to the steel sheet may be performed before, simultaneously with, or after the step of braze-welding along the steel/aluminum butt region.

In certain embodiments the aluminum sheet may have any thickness, or a thickness of 0.5-4 mm, preferably 0.6-3 mm, more preferably 0.8-2.5 mm. Further, the steel sheet may have any thickness, or a thickness of 0.5-4 mm, preferably 0.6-3 mm, more preferably 0.7-2 mm. Further, in any such embodiments the distance between the edge of the steel sheet and the edge of the aluminum sheet at the steel/aluminum butt region may be optionally from 0-5 mm, and preferably from 2-4 mm. Further, in any such embodiments the second steel sheet may have any thickness, or a thickness of 0.3-1 mm, preferably 0.5-1 mm.

In any of the embodiments disclosed herein, the thickness of the aluminum sheet is optionally larger than the thickness of the steel sheet.

Yet further embodiments provide a hybrid butt-lap joint comprising:

a portion of a steel sheet and a portion of an aluminum sheet with edges positioned in near contact with one another. Such hybrid butt-lap joints further comprise a second steel sheet across the steel sheet/aluminum sheet butt region flush with one face of the steel sheet and one face of the aluminum sheet, so that the second steel sheet overlaps in contact or near contact with both the steel sheet and aluminum sheet on one side thereof. The joint further includes solidified weld filler material extending across the steel/aluminum butt region to provide a butt joint, and between at least the second steel sheet and the aluminum sheet to provide a lap-joint therebetween. Optionally a solidified, previously melted, filler alloy foil or powder may be positioned between the second steel sheet and either or both of the steel sheet and the aluminum sheet to facilitate lap-joint formation. In the joint, at least the second steel sheet may be brazed to the steel sheet.

Further embodiments provide any hybrid butt-lap joint produced by any of the disclosed methods that employ a second steel sheet.

Further embodiments provide any steel/aluminum article comprising any hybrid butt-lap joint formed by the use of a second steel sheet as herein disclosed.

The following examples provide details of certain exemplary embodiments, and are in no way intended to be limiting with respect to the pending claims.

EXAMPLES

Example 1—An Example Aluminum/Steel Lap Joint (Prior Art)

Figures 1A, 1B:
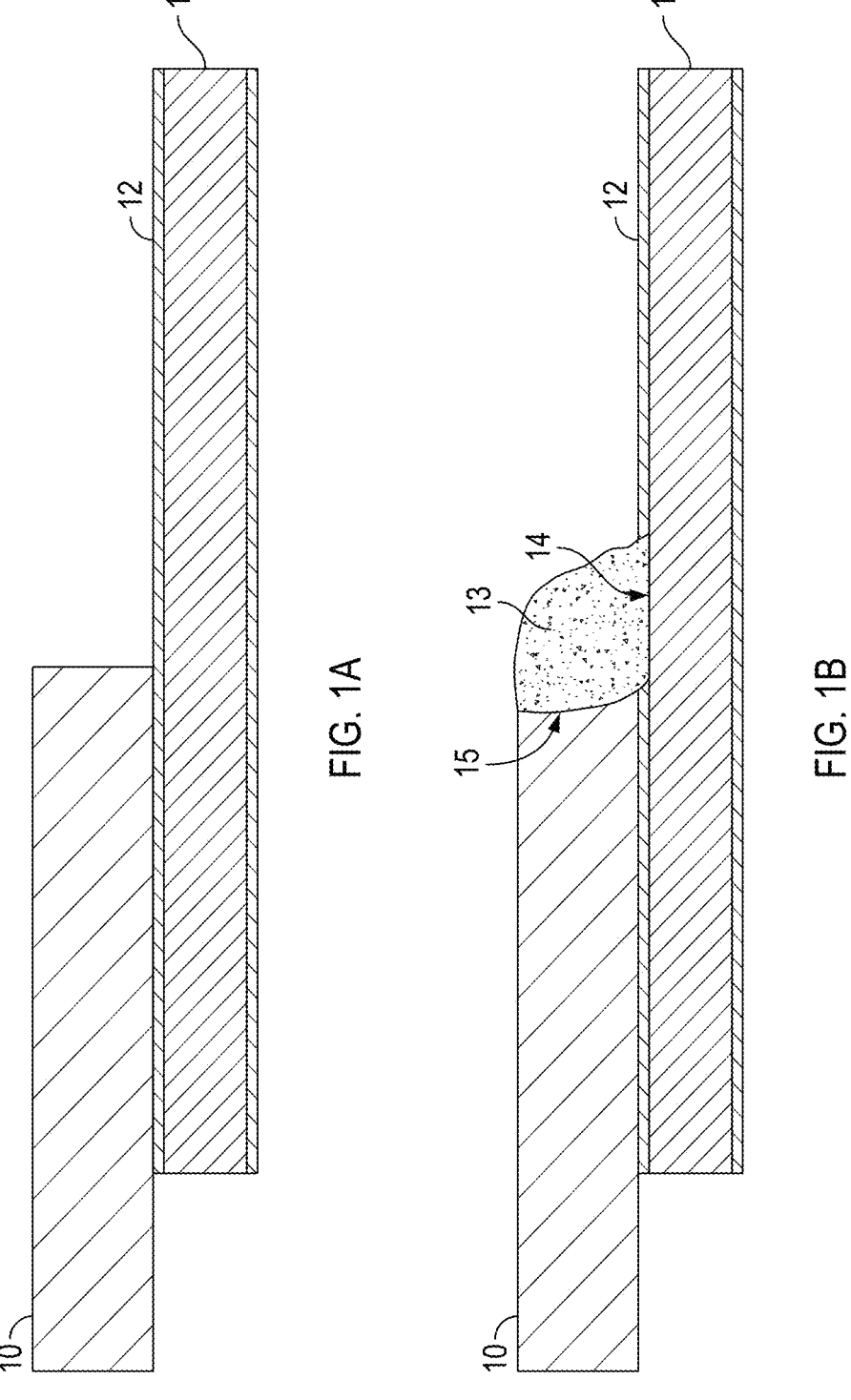
FIG. 1A illustrates in cross-section an aluminum/steel lap joint before braze welding.
FIG. 1B illustrates in cross-section an aluminum/steel lap joint after braze welding.

FIG. 1A illustrates in cross-section a typical aluminum sheet/steel sheet lap joint configuration before braze-welding, with the aluminum sheet 10 brought into juxtaposition in contact or near contact with steel sheet 11 along overlapping portions with the aluminum sheet on top of the steel sheet. As shown, steel sheet 11 includes zinc coating 12. FIG. 1B illustrates the same configuration after braze-welding with solidified, previously molten weld metal 13, resulting from mixing of melted aluminum sheet and the filler material, forming lap braze-welding 14 at the interface with the steel sheet 11, and also welding 15 to the aluminum sheet 10. Example techniques for such welding include but are not limited to arc welding methods such as gas metal arc welding (GMAW) and gas tungsten arc welding (GTAW) with adding filler material, laser beam welding with adding filler wire, as well as hybrid or combined laser-arc welding and cold metal transfer arc welding. The resulting braze-welding typically produces a fusion welding on the aluminum sheet side and a lap braze-welding between the solidified weld metal and the steel sheet.

Example 2—An Example Aluminum/Steel Butt Joint (Prior Art)

Figures 2A, 2B:
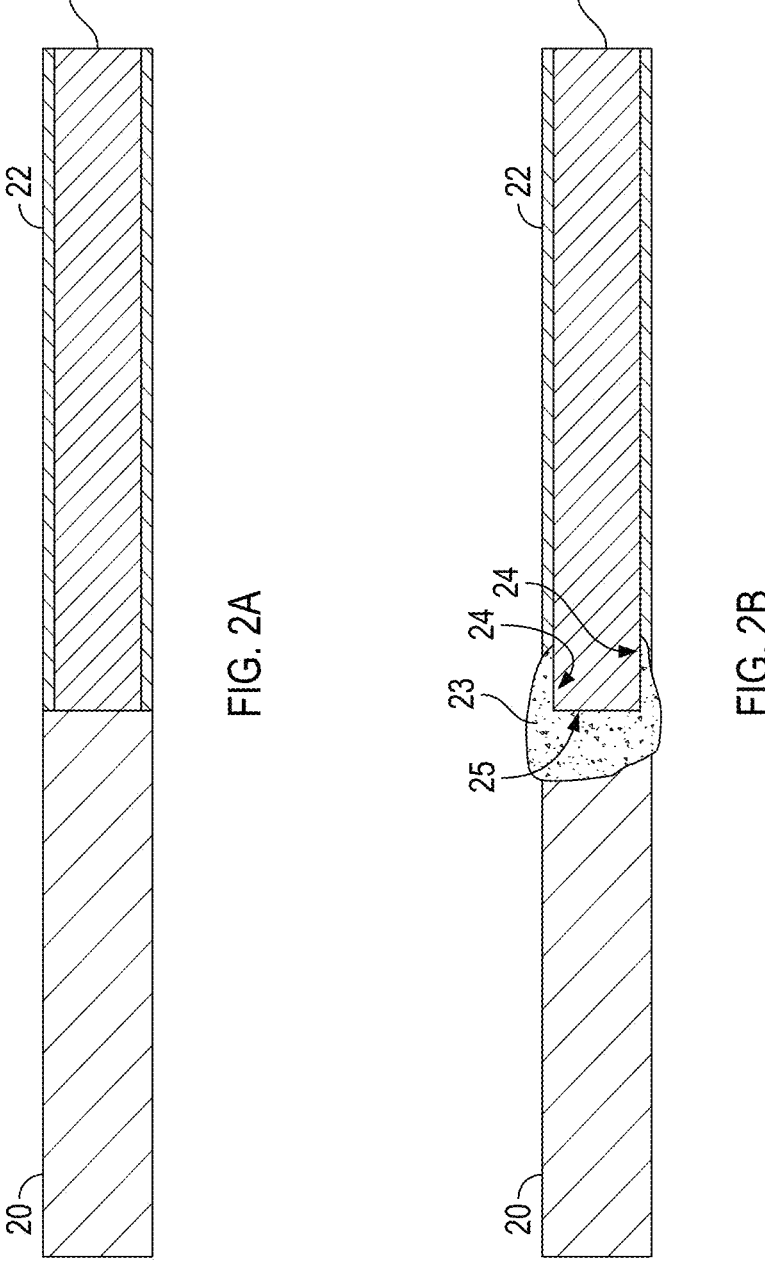
FIG. 2A illustrates in cross-section an aluminum/steel butt joint configuration before braze welding.
FIG. 2B illustrates in cross-section an aluminum/steel braze welded butt joint after braze welding.

FIG. 2A illustrates in cross-section a typical aluminum sheet/steel sheet butt joint configuration before gas metal arc braze welding, with the aluminum sheet 20 brought into an edge-to-edge (or end-to-end) juxtaposition in contact or near contact with an edge of steel sheet 21. As shown, steel sheet 21 includes zinc coating 22. FIG. 2B shows the braze-welded joint after the gas metal arc or CMT or CMT cycle step braze-welding with solidified, previously molten weld metal 23, resulting from mixing of melted aluminum sheet and the filler material, forming lap braze-welding 24 on the surface of one or both sides of the steel sheet 21, and also welding to the aluminum sheet 20 and butt braze-welding 25 between the solidified weld metal 23 and the steel sheet 21. The joint geometries are similar, but the hybrid laser-arc braze-welding may be preferred to achieve high-speed welding owing to the high-density laser power. Such techniques of the prior art can present some challenges. For example, when producing the aluminum/steel butt joint, the welding parameter window may be relatively small and may be difficult to control. If the heat input is too great, the heat may burn through the aluminum sheet, whereas if the heat input is too small then it may be insufficient to produce the lap braze welding on the side of the butt joint opposite the welding energy.

Example 3—An Example Aluminum/Steel Hybrid Butt-Lap Joint Comprising a Second Aluminum Sheet, Formed by Gas Metal Arc Braze-Welding in the Butt Region, or Combined Laser-Arc Braze-Welding in the Butt Region FIG. 3A illustrates in cross-section one embodiment of an aluminum sheet/steel sheet hybrid butt-lap joint configuration, in this case prior to gas metal arc braze-welding in the butt region 36 and laser brazing on a side 36a of the aluminum and steel sheets away from the butt region 36 (see arrows in FIG. 3A). In FIG. 3A the aluminum sheet 30 is brought into an edge-to-edge position with an opposing edge of steel sheet 31. As shown, steel sheet 31 includes zinc coating 32. However, in FIG. 3A an additional aluminum sheet 34 is illustrated in cross-section, which 'straddles' the butt region 36 between the aluminum sheet 30 and the steel sheet 31, approximately flush, in close contact or contact with facing surfaces of each of the aluminum and steel sheets. The order in which the sheets are brought together to produce the assembly as shown in FIG. 3A is inconsequential. FIG. 3B illustrates the same configuration as FIG. 3A, after completion of gas metal arc braze-welding along the aluminum/steel butt region 36 and laser brazing on a side 36a of the aluminum and steel sheets opposite the second aluminum sheet 34 (see arrows in FIG. 3A). For example, the gas metal arc welding may produce a weld between the aluminum sheet 30 and the second aluminum sheet 34. The molten weld metal 33 fills the butt region 36 and reacts with the steel sheet 31 to form a braze-welding at an edge face and a top face of the steel sheet 31. Optionally, a gap (not shown) may be maintained between the steel sheet 31 and the second aluminum sheet 34. The molten weld metal 33 may then be attracted into the gap by capillary force to facilitate formation of the brazed lap joint at the interface between the steel sheet 31 and the second aluminum sheet 34. Another option (not shown) is to include a filler alloy foil or a powder pre-placed between the steel sheet 31 and the second aluminum sheet 34, such that during welding the filler alloy foil or a powder melts to facilitate formation of a brazed lap joint 37 at the interface between the steel sheet 31 and the second aluminum sheet 34. Further, the steel sheet 31 may be heated, but not melted, by a laser beam, and the heat conducted to melt a portion of the second aluminum sheet 34 to form a lap brazed joint 35 between the steel sheet 31 and the second aluminum sheet 34. In any event, as illustrated in FIG. 3 B, the resulting hybrid butt-lap joint may include welding 38 between the aluminum sheet 30 and the second aluminum sheet 34, butt braze-welding 39 in the butt region 36 between the steel sheet 31 and the weld metal 33, and lap braze-welding 37 at the top-edge of the steel sheet 31, brazing 35a between the steel sheet 31 and the second aluminum sheet 34, in addition to the lap brazed joint 35 produced by the laser beam.

FIGS. 3 C and 3 D illustrate a similar but alternative arrangement to FIGS. 3A and 3 B. In FIG. 3 C combined laser-arc braze-welding (e.g. gas metal arc welding combined with laser welding) is applied to the butt region 36 between the aluminum sheet 30 and the steel sheet 31 on a side 36a opposite to second aluminum sheet 34 to achieve butt braze-welding and lap braze welding similar to that shown in FIG. 3 B. However, as shown in FIG. 3 C separate welding such as gas metal arc braze-welding or laser-arc braze-welding occurs upon a portion of the second aluminum sheet 34 (e.g. at an edge 34a of the second aluminum sheet 34) on a side opposite to steel sheet 31 to produce a lap brazed joint 35 between the second aluminum sheet 34 and the steel sheet 31. This causes the second aluminum sheet 34 to be at least partially braze-welded 35b to steel sheet 31 as shown in FIG. 3 D, thereby contributing to the overall strength of the braze-welded hybrid butt-lap configuration.

Example 4—An Example Aluminum/Steel Hybrid
Butt-Lap Joint Comprising a Second Aluminum
Sheet, Formed by Gas Metal Arc Braze-Welding FIG. 4A illustrates in cross-section one embodiment of an aluminum sheet/steel sheet hybrid butt-lap joint configuration, in this case prior to gas metal arc braze-welding. In FIG. 4A the aluminum sheet 40 is brought into an edge-to-edge (or end-to-end) juxtaposition near contact with an opposing edge of steel sheet 41. As shown, steel sheet 41 includes zinc coating 42. However, in FIG. 4A an additional aluminum sheet 44 is illustrated in cross-section, which 'straddles' the butt region 45 between the aluminum sheet 40 and the steel sheet 41, approximately flush, in close contact or contact with facing surfaces of each of the aluminum and steel sheets. The order in which the sheets are brought together to produce the assembly as shown in FIG. 4A is inconsequential. FIG. 4 B illustrates the same configuration as FIG. 4A, after completion of the gas metal arc braze-welding. The heat input for the weld may be chosen to produce a fusion welding 46 between the aluminum sheet 40 and the second aluminum sheet 44. Optionally, a gap (not shown) may be maintained between the steel sheet 41 and the second aluminum sheet 44. The solidified, previously molten weld metal 43 may then be attracted into the gap by capillary force to facilitate formation of the brazed lap joint at the interface between the steel sheet 41 and the second aluminum sheet 44. Another option (not shown) is to include a filler alloy foil or powder pre-placed between the steel sheet 41 and the second aluminum sheet 44, such that during welding the filler alloy foil or powder melts to facilitate formation of a brazed lap joint at the interface between the steel sheet 41 and the second aluminum sheet 44. In any event, as illustrated in FIG. 4 B, the resulting hybrid butt-lap joint otherwise may have a similar configuration as compared to FIG. 3 B. The presence of the second aluminum sheet 44 facilitates production of the butt joint 47 at the butt region 45 between the aluminum and steel sheets by conventional gas metal arc welding, and the control of the heat input for the welding process may be refined. CMT welding with a lower heat input may also be preferred in certain embodiments.

Example 5—An Example Aluminum/Steel Hybrid
Butt-Lap Joint Comprising a Second Steel Sheet,
Formed by Gas Metal Arc Braze-Welding in the
Butt Region, or Combined Laser-Arc
Braze-Welding in the Butt Region FIG. 5A illustrates in cross-section one embodiment of an aluminum sheet/steel sheet hybrid butt-lap joint configuration, in this case prior to gas metal arc braze-welding in the butt region 56, and laser beam welding away from the butt region. In FIG. 5A the aluminum sheet 50 is brought into an edge-to-edge (or end-to-end) juxtaposition near contact with an opposing edge of steel sheet 51. As shown, steel sheet 51 includes zinc coating 52. However, in FIG. 5A an additional steel sheet 54 is illustrated in cross-section, which 'straddles' the butt region 56 between the aluminum sheet 50 and the steel sheet 51, approximately flush, in close contact or contact with facing surfaces of each of the aluminum and steel sheets. The order in which the sheets are brought together to produce the assembly as shown in FIG. 5A is inconsequential. FIG. 5 B illustrates the same configuration as FIG. 5A, after completion of both gas metal arc braze-welding in the butt region 56 and laser welding away from the butt region 56, generally on a side 56a of the aluminum and steel sheets opposite to the second steel sheet 54, and laser welding near but away from the butt region 56 upon the steel sheet 51. As shown in FIG. 5 B, the gas metal arc braze-welding in the butt region 56 produces a weld 53, and the laser welding produces a fusion welding 55 between the steel sheet 51 and the second steel sheet 54. In the embodiment shown in FIG. 5 B, the position of the laser beam for laser welding does not overlap with the top braze welded zone. The gas metal arc welding generates a braze-welded lap joint 57 between the aluminum sheet 50 and the second steel sheet 54, a braze-welded butt joint 58 between the aluminum sheet 50 and the steel sheet 51, as well as a lap braze-welding 59, and a brazing, above and below the steel sheet 51, respectively.

FIGS. 5 C and 5 D illustrate a similar but alternative arrangement to FIGS. 5A and 5 B. In FIG. 5 C combined laser-arc braze welding (e.g. gas metal arc welding combined with laser welding) is applied to the butt region 56 between aluminum sheet 50 and steel sheet 51 on a side 56*a* of the aluminum and steel sheets opposite to second steel sheet 54 to achieve butt braze-welding and lap braze-welding similar to that shown in FIG. 5 B. As per FIG. 5A, in FIG. 5 C separate laser welding occurs between the steel sheet 51 and the second steel sheet 54, thereby contributing to the overall strength of the braze-welded hybrid butt-lap joint configuration.

Example 6—An Example Aluminum/Steel Hybrid Butt-Lap Joint Comprising a Second Steel Sheet, Formed by Gas Metal Arc Braze-Welding in the Butt Region FIG. 6A illustrates in cross-section one embodiment of an aluminum sheet/steel sheet hybrid butt-lap joint configuration, in this case prior to gas metal arc welding such as CMT welding. In FIG. 6A the aluminum sheet 60 is brought into an edge-to-edge (or end-to-end) juxtaposition or near contact with an opposing edge of steel sheet 61. As shown, steel sheet 61 includes zinc coating 62. However, in FIG. 6A an additional steel sheet 64 is illustrated in cross-section, which 'straddles' the butt region 66 between the aluminum sheet 60 and the steel sheet 61, approximately flush, or in close contact or contact with facing surfaces of each of the aluminum and steel sheets. The order in which the sheets are brought together to produce the assembly as shown in FIG. 6A is inconsequential. FIG. 6 B illustrates the same configuration as FIG. 6A, after completion of gas metal arc welding this time absent the use of a laser beam. As illustrated in FIG. 6 B, the braze-welding generates a butt-lap joint comprising a fusion welding of weld metal 63 to aluminum sheet 60, a butt braze-weld 67 at the butt region 66 between the weld metal 63 and the steel sheet 61, a lap braze-weld 68 between the solidified weld metal 63 and the second steel sheet 64 at the bottom of the butt region 66, as well as lap braze-welds 69 and lap braze on the top and the bottom of steel sheet 61, respectively. Optionally, a gap (not shown) may be maintained between the steel sheet 61 and the second steel sheet 64. The molten weld metal 63 may then be attracted into the gap by capillary force to facilitate formation of the brazed lap joint at the interface between the steel sheet 61 and the second steel sheet 64. Another option (not shown) is to include a filler alloy foil or powder pre-placed between the steel sheet 61 and the second steel sheet 64, such that during welding the filler alloy foil or powder may melt to facilitate formation of a brazed lap joint at the interface between the steel sheet 61 and the second steel sheet 64.

FIGS. 6 C and 6 D illustrate a similar but alternative arrangement to FIGS. 6A and 6 B. In FIG. 6 C gas metal arc braze-welding is applied to the butt joint region 66 between aluminum sheet 60 and steel sheet 61 on a side opposite to second steel sheet 64 to achieve butt braze-welding and lap braze-welding similar to that shown in FIG. 6 B. However, as shown in FIG. 6 C separate welding such as gas metal arc welding occurs upon a portion of second steel sheet 64 (e.g. at an edge 64*a* of the second steel sheet 64) on a side opposite to steel sheet 61. This causes the second steel sheet 64 to be at least partially welded to steel sheet 61 by producing the weld 65, as shown in FIG. 6 D, thereby contributing to the overall strength of the braze-welded hybrid butt-lap configuration.

Example 7—Analysis of a Aluminum/Steel Hybrid Butt-Lap Joint Formed in Accordance with Example 6

A butt-lap joint of an AA2024 aluminum alloy sheet with a thickness of 1.27 mm and a Dual phase DP 780 steel sheet of 1 mm thick with a 10-µm thick Zn coating on the surface was braze-welded using the CMT welding process, with a Fronius TPS 4000 CMT advanced power source (Fronius International, Austria) operating at direct current electrode positive (DCEP) polarity and with a Robacta 5000 torch. AA2024 sheet was sheared into small coupons with a dimension of 100 mm×200 mm, and DP 780 steel sheets were sheared into small coupons with a dimension of 100 mm×200 mm and 50 mm×200 mm. The 50 mm×200 mm DP sheet was used as the second steel sheet during the assembly of the hybrid butt-lap joint.

Prior to braze-welding, no further edge preparation was applied and no brazing flux was employed on the sheared uncoated edge of the steel sheet and the aluminum sheet, although trimming the steel edge to premachine a groove or applying a flux may facilitate the joint formation. The steel sheet and the second steel sheet were cleaned with acetone, whereas the aluminum sheet was brushed using a stainless steel brush and then cleaned in acetone before clamping them into the butt-lap assembly. The width of the gap between the aluminum sheet and the steel sheet was 2.5 mm. Al 4020 (EN ISO 18273) AlSi3Mn wire with a diameter of 1.2 mm was used as a filler material. The wire feed speed was 6 m/min, the welding speed was 0.9 m/min. Argon gas was used as a shielding gas with a flow rate of 18 l/min. The welding torch was perpendicular to the aluminum sheet with the filler wire on the edge of the aluminum sheet adjacent to the butt region, which is similar to the set-up of a traditional braze-welding of a butt joint, or a lap joint. However, during CMT braze-welding, a weaving motion was used towards the steel sheet side, instead of a stringer motion.

After braze-welding in the butt region along the longitudinal direction, the steel sheet was welded to the second steel sheet using CMT welding with ER-70s filler wire. Then the welded coupon was sectioned perpendicular to the welding direction using a water jet into 15 mm wide small pieces for the tensile test.

FIG. 7 provides a photograph of a cross-sectional view of the hybrid "butt-lap" joint produced. The CMT braze-welding generates a butt-lap joint comprising a fusion welding of solidified weld metal 72 to the aluminum sheet 70, a butt braze-weld 74 at the butt region between the aluminum sheet 70 and steel sheet 71, a lap braze-welded joint 75 between the aluminum sheet 70 and the second steel sheet 73, as well as lap braze welds 76 on the top and the bottom of steel sheet 71. The liquid weld metal has been attracted into the gap by capillary force to produce the brazed lap joint at the interface between the steel sheet 71 and the second steel sheet 73. Most of the butt-lap braze-welded joints fractured in the weld metal 72 adjacent to the aluminum sheet 70, with an average tensile strength of 105 MPa. Some of the butt-lap braze-welded joints fractured at the interface between the weld metal 72 and the second steel sheet 73, with an average shear strength of 63 MPa.

Whilst various embodiments have been described, they are exemplary to the present disclosure and are in no way intended to be limiting to the scope and construction of the appended claims.

The invention claimed is:

1. A method for producing a hybrid butt-lap braze-welded joint between a steel workpiece and an aluminum workpiece, each of which comprise two faces and at least one edge surface, the method comprising the steps of:
   a) positioning the steel workpiece and the aluminum workpiece for edge-to-edge contact with one another, thereby to provide a steel/aluminum butt region between an edge of the steel workpiece and an edge of the aluminum workpiece;

b) positioning a second aluminum workpiece flush across the steel/aluminum butt region on one side of the steel and aluminum workpieces, so that the second aluminum workpiece overlaps in contact both with a portion of one face of the steel workpiece and a portion of one face of the aluminum workpiece adjacent the steel/aluminum butt region; and c) braze welding along the steel/aluminum butt region, on a side of the steel and aluminum workpieces opposite the second aluminum workpiece.

2. The method of claim 1, wherein step c) of braze welding comprises feeding molten filler wire to the steel/aluminum butt region, a portion of the molten filler wire being forced between the steel workpiece and the aluminum workpiece to produce a braze-welded butt joint.

3. The method of claim 1, wherein at least a portion of the second aluminum workpiece adjacent the aluminum workpiece melts during step c) of braze welding, thereby to form a welded joint between the aluminum workpiece and the second aluminum workpiece.

4. The method of claim 1, wherein step c) of braze welding comprises at least one of gas metal arc welding (GMAW), cold metal transfer arc welding, gas tungsten arc welding (GTAW) with adding wire, laser welding with adding wire, and hybrid or combined laser-arc welding.

5. The method of claim 1, wherein step c) of braze welding comprises combined laser-arc braze-welding by combined application of a laser and a gas metal arc welding torch to at least the steel/aluminum butt region.

6. The method of claim 5, wherein a laser beam of the laser is directed to at least one of:

the edge of the aluminum workpiece and the interface between the steel workpiece and the second aluminum workpiece.

7. The method of claim 1, wherein in step c) of braze welding comprises gas metal arc braze-welding, wherein a welding torch applies filler wire to the steel/aluminum butt region.

8. The method of claim 7, wherein the welding torch applies the filler wire to the edge of the aluminum workpiece.

9. The method according to claim 8, wherein the welding torch applies filler wire at an angle of 1-10 degrees compared to perpendicular to the steel workpiece.

10. The method of claim 9, wherein the welding torch applies filler wire at an angle of 2-5 degrees compared to perpendicular to the steel workpiece.

11. The method of claim 7, wherein the welding torch employs argon shielding gas.

12. The method of claim 7, wherein the welding torch applies the filler wire to the steel/aluminum butt region in a weaving motion from the aluminum workpiece side towards the steel workpiece side.

13. The method of claim 1, wherein the distance between the edge of the steel workpiece and the edge of the aluminum workpiece at the steel/aluminum interface is from 0-5 mm.

14. The method of claim 13, wherein the distance between the edge of the steel workpiece and the edge of the aluminum workpiece at the steel/aluminum interface is from 0-2 mm.

15. The method of claim 1, wherein the second aluminum workpiece has a thickness of 0.3-2 mm.

16. The method of claim 15, wherein the second aluminum workpiece has a thickness of 0.5-1.5 mm.

17. The method of claim 1, wherein the steel workpiece is a steel sheet.

18. The method of claim 1, wherein the aluminum workpiece is an aluminum sheet.

19. The method of claim 1, wherein the steel workpiece comprises a zinc surface layer.

20. The method of claim 1, wherein the method further comprises the step of:

d) welding on a same side of the steel and aluminum workpieces as the second aluminum workpiece, to lap braze weld the second aluminum workpiece and the steel workpiece together.

21. The method of claim 1, wherein step c) of braze welding comprises feeding molten filler wire to the steel/aluminum butt region, a portion of the molten filler wire being forced between the steel workpiece and the second aluminum workpiece by capillary action to produce a brazed lap joint between the steel workpiece and the second aluminum workpiece.

* * * * *